(12) United States Patent
Shimizu et al.

(10) Patent No.: US 10,502,645 B2
(45) Date of Patent: Dec. 10, 2019

(54) DYNAMOMETER DEVICE

(71) Applicant: MEIDENSHA CORPORATION, Tokyo (JP)

(72) Inventors: Takahiro Shimizu, Ashikaga (JP); Shigeo Watanabe, Fukaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/309,586

(22) PCT Filed: Feb. 27, 2017

(86) PCT No.: PCT/JP2017/007344
§ 371 (c)(1),
(2) Date: Dec. 13, 2018

(87) PCT Pub. No.: WO2017/217021
PCT Pub. Date: Dec. 21, 2017

(65) Prior Publication Data
US 2019/0310145 A1 Oct. 10, 2019

(30) Foreign Application Priority Data

Jun. 15, 2016 (JP) .............................. 2016-118431

(51) Int. Cl.
| | | |
|---|---|---|
| G01L 3/02 | (2006.01) |
| G01L 3/00 | (2006.01) |
| F01P 3/00 | (2006.01) |
| G01M 17/007 | (2006.01) |

(52) U.S. Cl.
CPC ................. *G01L 3/00* (2013.01); *F01P 3/00* (2013.01); *G01L 3/02* (2013.01); *F01P 2003/006* (2013.01); *G01M 17/007* (2013.01)

(58) Field of Classification Search
None
See application file for complete search history.

(56) References Cited

U.S. PATENT DOCUMENTS

| | | | |
|---|---|---|---|
| 5,396,811 A | 3/1995 | Quartarone | |
| 2006/0137443 A1* | 6/2006 | Engstrom | ............. F16K 5/0414 73/168 |
| 2009/0107254 A1* | 4/2009 | Engstrom | ............. F04D 19/007 73/862 |
| 2011/0303000 A1* | 12/2011 | Engstrom | ......... G01M 17/0074 73/116.06 |

(Continued)

FOREIGN PATENT DOCUMENTS

| | | | |
|---|---|---|---|
| CN | 202092809 U | * | 12/2011 |
| GB | 378839 A | | 8/1932 |

(Continued)

*Primary Examiner* — Andre J Allen
(74) *Attorney, Agent, or Firm* — Foley & Lardner LLP (57) ABSTRACT

In a dynamometer device (1), a dynamometer (5) is placed on a dynamometer-side bed (6), and the dynamometer-side bed (6) is stacked on a tank-side bed (15) located on the top part of a bed tank (3). The dynamometer (5) is connected to the bed tank (3) by an oil discharge pipe (9) which returns a cooling oil (2) to the bed tank (3) from the dynamometer (5). The oil discharge pipe (9) passes through an interface (23) between the dynamometer-side bed (6) and the tank-side bed (15), and extends into the bed tank (3).

2 Claims, 8 Drawing Sheets

(56) References Cited

U.S. PATENT DOCUMENTS

2013/0283900 A1\* 10/2013 Engstrom ......... G01M 17/0074
                                                              73/115.05

FOREIGN PATENT DOCUMENTS

| JP | 42-16797 B1 | 9/1967 | | |
|---|---|---|---|---|
| JP | 48-012076 A | 2/1973 | | |
| JP | 52-167077 U1 | 6/1976 | | |
| JP | 56-010831 A | 2/1981 | | |
| JP | 57-077929 A | 5/1982 | | |
| JP | 61-164128 A | 7/1986 | | |
| JP | 2008-275431 | 11/2008 | | |
| JP | 6168199 B1 \* | 7/2017 | ............ | G01M 15/02 |

\* cited by examiner

DYNAMOMETER DEVICE

TECHNICAL FIELD

The present invention relates to a dynamometer device in which a dynamo body is placed on a tank.

BACKGROUND TECHNOLOGY

In a patent document 1, a dynamometer device for performing performance evaluation and a durability test by using, for example, an engine as a test body has been disclosed. In this dynamometer device, a dynamo body is placed on a tank for storing a cooling medium. The dynamo body and the tank are connected to each other by a pipe used for returning the cooling medium from the dynamo body to the tank. This pipe is connected to an inlet of the tank which is provided on the side part of the tank.

However, in the dynamometer device of the patent document 1, since a relatively long pipe is used for connecting the dynamo body and the tank which are located adjacent to each other in the vertical direction, there is possibility that an increase in pressure loss of the cooling medium passing through the pipe and an increase in the number of parts composing the pipe occur.

PRIOR ART DOCUMENT

Patent Document

Patent Document 1: Japanese Patent Application Publication 2008-275431

SUMMARY OF THE INVENTION

In the present invention, a dynamometer device includes: a tank for storing a cooling medium; a dynamo body provided on the tank; and a pipe passing through an interface between the dynamo body and the tank, and extending into the tank from the dynamo body, the pipe returning the cooling medium from the dynamo body to the tank.

Consequently, the pipe passes through the interface between the dynamo body and the tank, and the outlets of the pipe open inside the tank.

According to the present invention, since the pipe passes through the interface between the dynamo body and the tank, it is possible to connect the dynamo body with the tank by using a relatively short pipe.

In addition, since the outlets of the pipe open inside the tank, parts connecting the outlets of the pipe with the tank can be omitted.

MODE FOR IMPLEMENTING THE INVENTION

In the following, one embodiment of the present invention will be explained with reference to the drawings.

Figure 1:
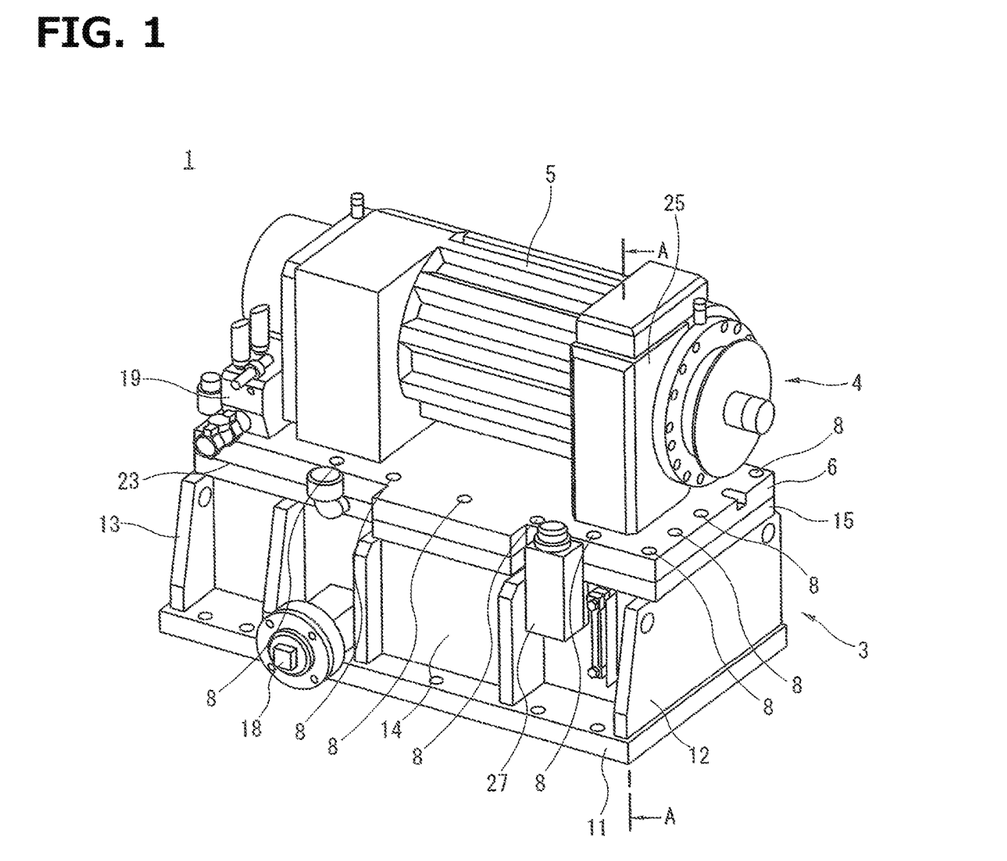
FIG. 1 is a perspective view of a dynamometer device in one embodiment.

In FIG. 1, an oil-cooled dynamometer device 1 in one embodiment of the present invention is shown. The dynamometer device 1 is used to perform performance evaluation and a durability test by using, for example, an engine, a transmission or the like of a vehicle as a test body.

The dynamometer device 1 is equipped with a bed tank 3 for storing a cooling oil 2 as a cooling medium and a dynamo body 4 provided on this bed tank 3.

Figure 2:
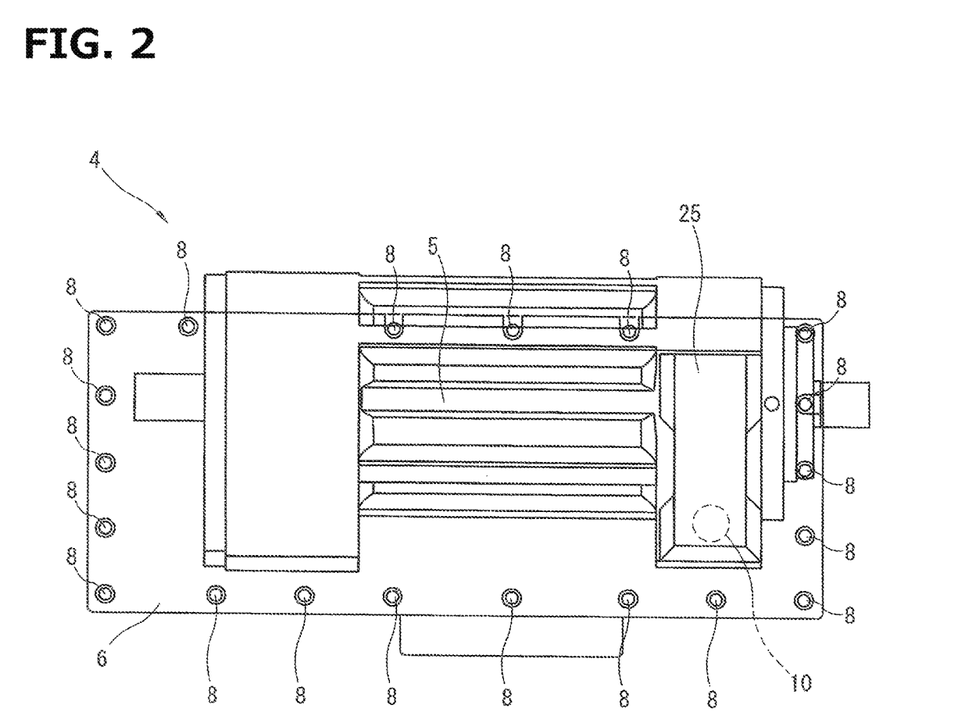
FIG. 2 is a top view of a dynamo body.
Figure 8:
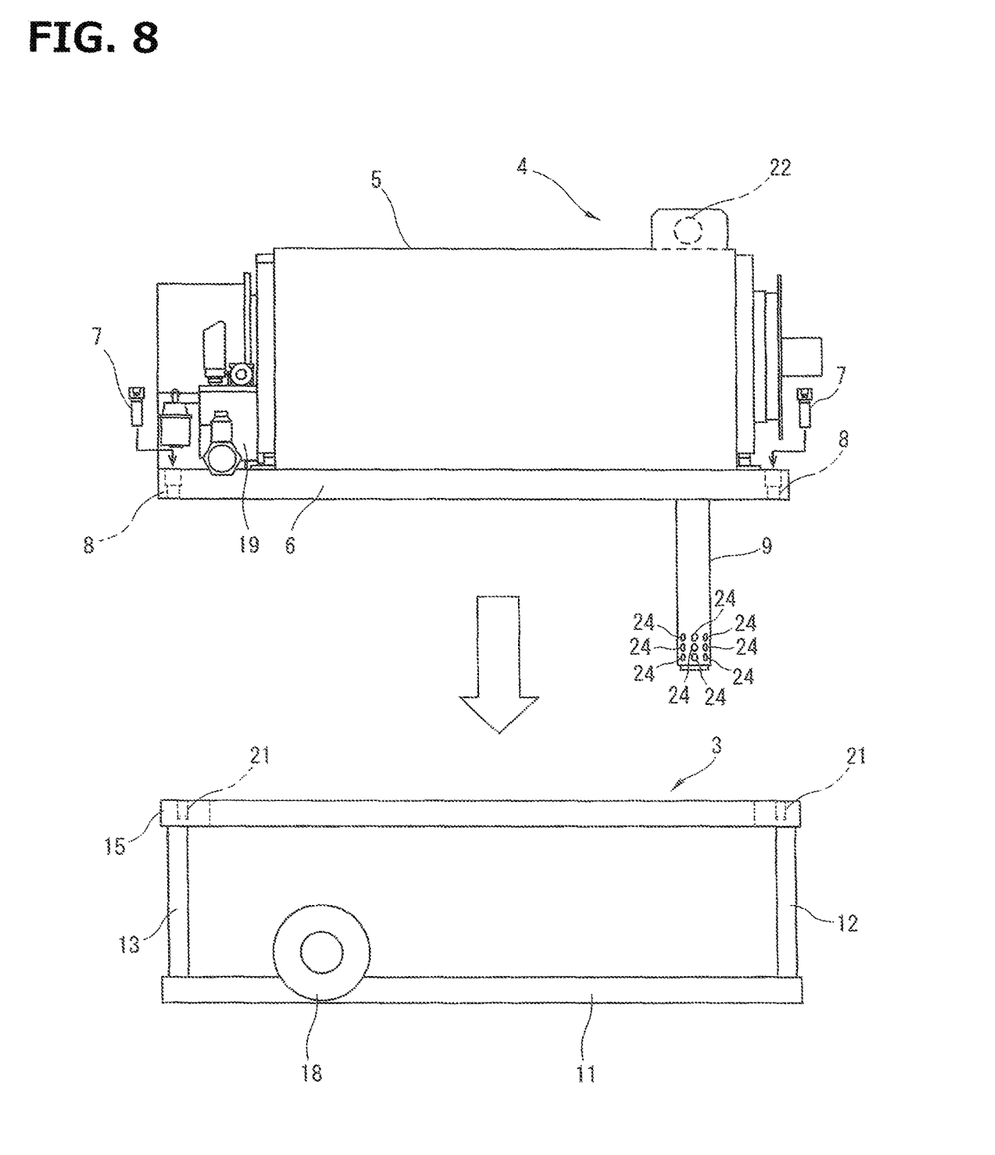
FIG. 8 is an explanatory view showing the dynamo body and the bed tank before assembling them.

The dynamo body 4 is equipped with a long narrow dynamometer 5 formed in a substantially cylindrical shape and a plate-shaped dynamometer-side bed 6 on which this dynamometer 5 is placed. The dynamometer 5 accommodates a rotor, a stator, coils, permanent magnets and the like which are not shown in the drawings. The dynamometer-side bed 6 is formed in a flat bed shape having sufficient strength by using steel material, and, as shown in FIG. 1, has a long narrow external shape along the axial direction of the dynamometer 5. As shown in FIG. 2, the dynamometer-side bed 6 is provided with, at the peripheral edge part thereof, a plurality of through holes 8 through which bolts 7 pass (FIG. 8). The through holes 8 each have a step (FIG. 8) such that the heads of the bolts 7 engage with the through holes 8 in the insides of the through holes 8. Moreover, also as shown in FIG. 2, the dynamometer-side bed 6 is provided with a through hole 10 for an oil discharge pipe into which the after-mentioned oil discharge pipe 9 is inserted.

The dynamometer 5 is placed on the top of the dynamometer-side bed 6 in a posture in which a rotation shaft 5a (FIG. 5) of the dynamometer 5 becomes parallel to the dynamometer-side bed 6.

As shown in FIG. 1, the bed tank 3 is equipped with a bottom wall 11, a front wall 12 and a rear wall 13 vertically rising up from the bottom wall 11, two side walls 14, 14 (in FIG. 1, only one of the side walls 14 is shown) connecting the front wall 12 with the rear wall 13, and with a tank-side bed 15 located at the top part of the bed tank 3 and supported by the front wall 12, the rear wall 13 and the two side walls 14, 14.

Figure 3:
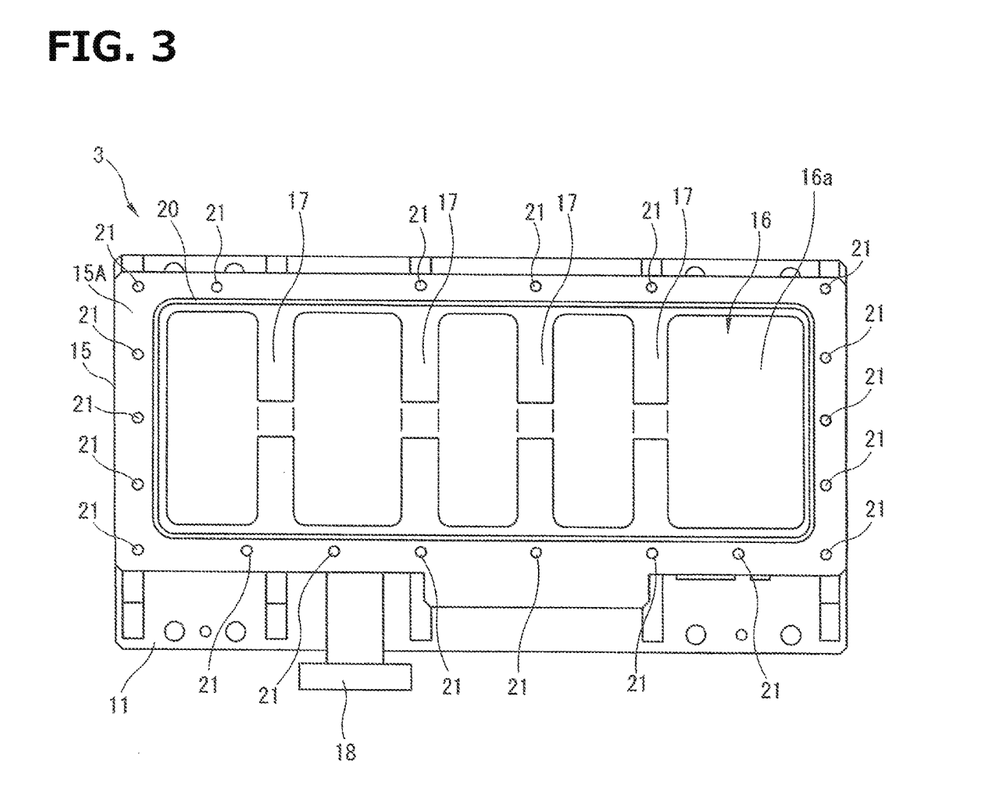
FIG. 3 is a top view of a bed tank.

As shown in FIG. 3, the inside of the bed tank 3 is a cooling oil reservoir 16 for storing the cooling oil 2. As shown in FIG. 3, four reinforcing walls 17 connecting the side walls 14, 14 to each other are provided between the two side walls 14, 14. The inside of the cooling oil reservoir 16 is partitioned by the four reinforcing walls 17, and adjacent partitions in the cooling oil reservoir 16 communicate with each other. One of the side walls 14 (the side wall 14 on the front side of FIG. 1) is provided with a cooling oil injection port 27 used for injecting the cooling oil 2 into the cooling oil reservoir 16 after the assembling of the dynamometer device 1 and with an oil outlet 18 used for taking out the cooling oil 2 from the cooling oil reservoir 16. This oil outlet 18 is connected to a manifold 19 disposed on one end side (left side of FIG. 4) in the axial direction of the dynamometer 5 through a pump unit which is not shown in the drawings.

The tank-side bed 15 is also formed in a flat bed shape by using steel material, and has an external shape corresponding to the dynamometer-side bed 6. The middle part of the tank-side bed 15 has an opening part 16a having a substantially rectangular shape so as to open the upper surface side of the cooling oil reservoir 16. An upper surface 15A of the tank-side bed 15 is formed in a smooth flat surface. As shown in FIG. 3, the upper surface 15A is formed with a continuous seal groove 20 having a substantially rectangular shape so as to surround the opening part 16a. The seal groove 20 is fitted with a continuous seal formed in a frame shape which is made of, for example, a rubber, seal which is not shown in the drawings. Moreover, as shown in FIG. 3, the tank-side bed 15 is provided with screw holes 21 with which the bolts 7 are screwed, at positions corresponding to the respective through holes 8 of the dynamometer-side bed 6.

Figure 5:
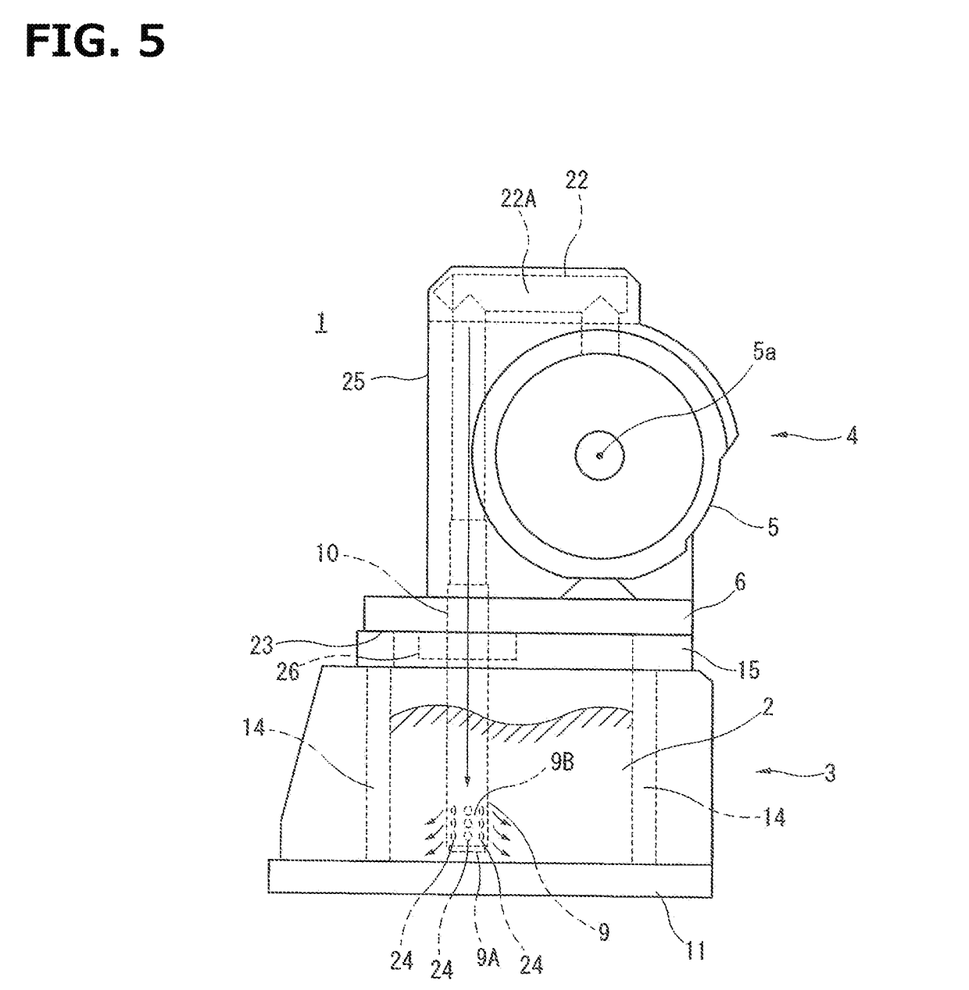
FIG. 5 is a front view of the dynamometer device in one embodiment.
Figure 7:
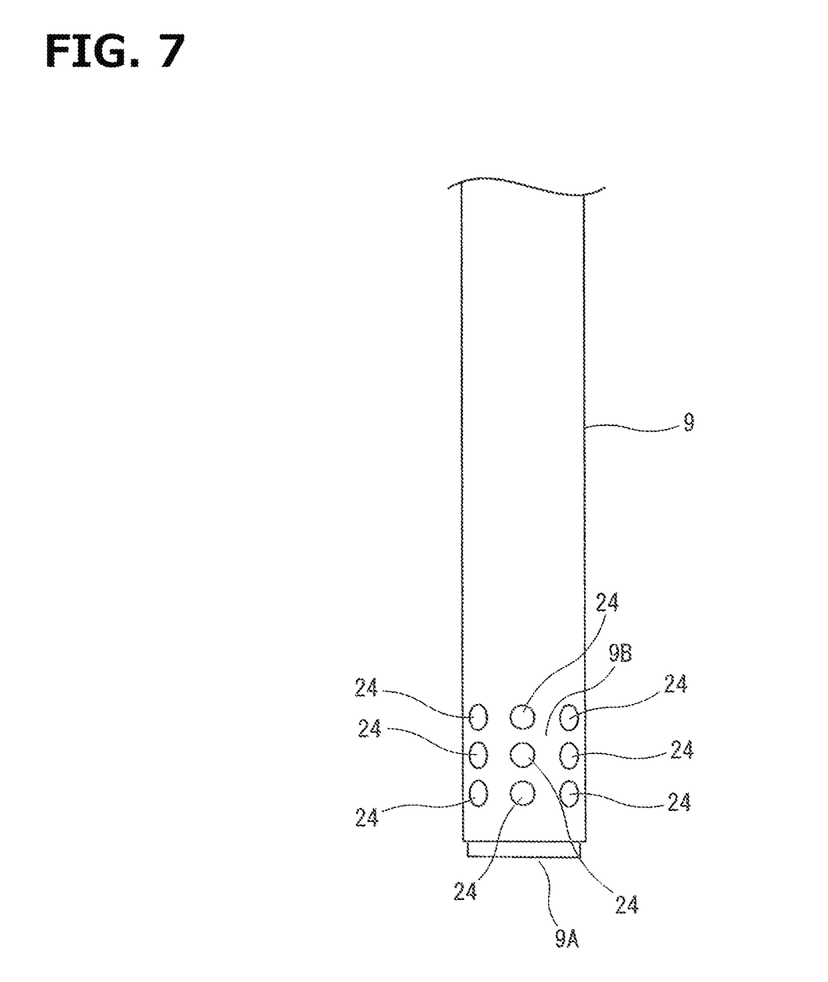
FIG. 7 is an explanatory view of the oil discharge pipe.

In addition, in the end portion of the dynamometer 5 on the opposite side to the manifold 19, the oil discharge pipe 9 for returning the cooling oil 2 to the bed tank 3 is routed from the upper part of the dynamometer 5. That is, as shown in FIG. 5, a long narrow oil discharge block 22 equipped with a flow passage 22A projects to a side of the dynamometer 5 from the upper part of the cylindrical dynamometer 5, and the oil discharge pipe 9 communicating with the flow passage 22A extends into the bed tank 3 through the oil discharge pipe through hole 10 of the dynamometer-side bed 6. The oil discharge pipe 9 is disposed vertically and linearly. In a position (position along a left-right direction of FIG. 5) apart from the rotation shaft 5a of the dynamometer 5 to a side thereof by a length substantially corresponding to the radius of the dynamometer 5, the oil discharge pipe 9 passes through an interface 23 between the dynamometer-side bed 6 and the tank-side bed 15, and extends to the inside of the bed tank 3. The oil discharge block 22 is configured so as to gather the air from the dynamometer 5. The oil discharge pipe 9 is formed in a cylindrical shape in which a distal end surface 9A is closed (the end surface of the oil discharge pipe 9 facing the bottom wall 11 in FIG. 5), and, as shown in FIG. 7, a plurality of oil discharge holes 24 for discharging the cooling oil 2 in the radial direction of the oil discharge pipe 9 are provided on the outer peripheral surface of a distal end part 9B of the oil discharge pipe 9. In the present embodiment, each of the oil discharge holes 24 has a circular shape in cross-section. The oil discharge pipe 9 is formed to have a sufficient length such that the distal end surface 9A is located at a position close to the bottom surface of the cooling oil reservoir 16, and when a specified amount of the cooling oil 2 is filled in the bed tank 3, the oil discharge holes 24 are located inside the cooling oil 2. That is, when a specified amount of the cooling oil 2 is filled, the distal end part 9B of the oil discharge pipe 9 is located inside the cooling oil 2 in the bed tank 3, and the cooling oil 2 is radially discharged from the oil discharge holes 24. The oil discharge pipe 9 and the oil discharge block 22 are accommodated in a case 25 extending in a rectangular shape from the outer peripheral part of the cylindrical dynamometer 5.

Figure 6:
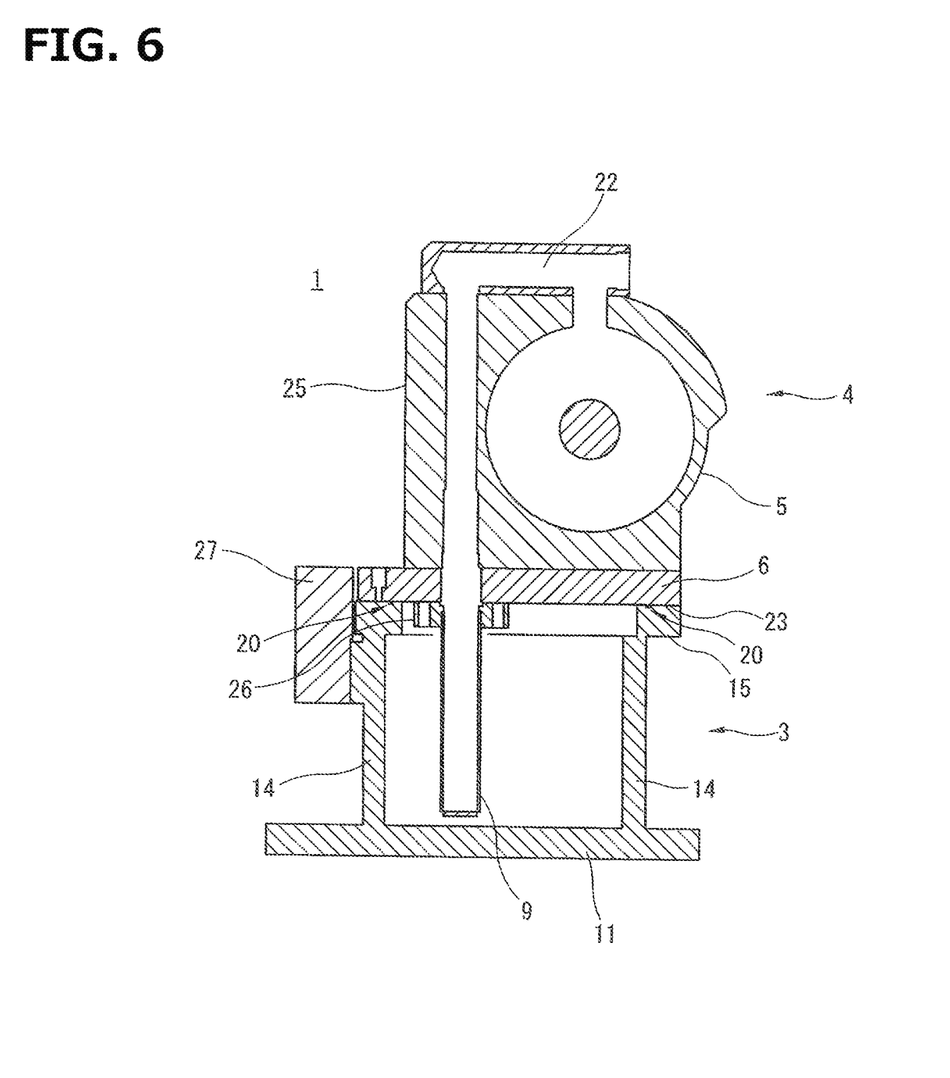
FIG. 6 is a sectional view of the dynamo body, the bed tank and an oil discharge pipe taken along an A-A line of FIG. 1.

In addition, as shown in FIG. 6, the oil discharge pipe 9 is fixed to the dynamometer-side bed 6 by an oil discharge flange 26 provided on the lower surface side of the dynamometer-side bed 6 and a bolt which is not shown in the drawings.

The dynamometer device 1 is configured by assembling the dynamo body 4, the bed tank 3, the oil discharge pipe 9 and the like. In the dynamometer device 1, the stacked dynamometer-side bed 6 and tank-side bed 15 substantially become an integrated bed. The dynamometer 5 is placed on the dynamometer-side bed 6 in a posture in which the rotation shaft 5a of the dynamometer 5 becomes parallel to the interface 23.

Figure 4:
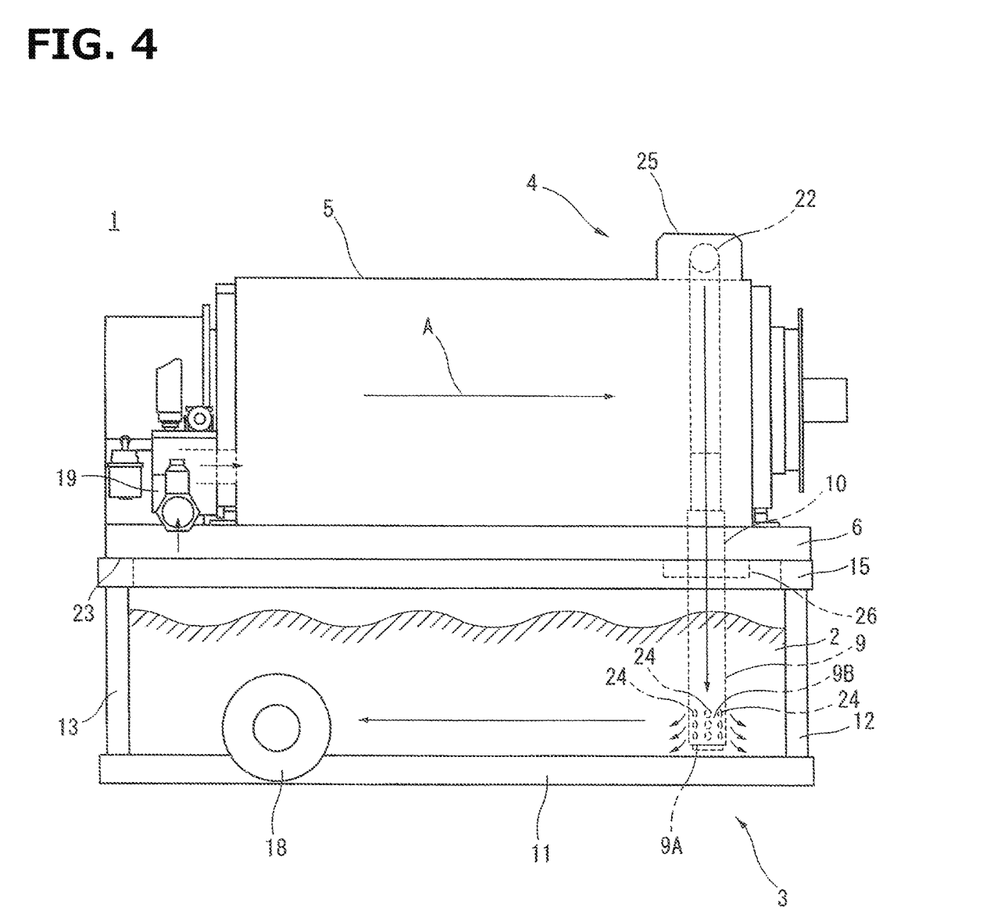
FIG. 4 is a side view of the dynamometer device in one embodiment.

Next, with reference to FIG. 4 and FIG. 5, the flow (shown by an arrow in FIG. 4 and FIG. 5) of the cooling oil 2 in the dynamometer device 1 will be explained. As shown in FIG. 4, the cooling oil 2 taken out from the oil outlet 18 flows into the dynamometer 5 through the manifold 19 by driving a pump unit which is not shown in the drawings. As shown in FIG. 4, the cooling oil 2 flows inside the dynamometer 5 along an axial direction A, and thereby coils, permanent magnets and the like which are not shown in the drawings are cooled. As shown in FIG. 5, in the end portion of the dynamometer 5 on the opposite side to the manifold 19, the cooling oil 2 of which temperature becomes high by cooling the coils, the permanent magnets and the like flows into the oil discharge pipe 9 from the upper part of the dynamometer 5 through the flow passage 22A of the oil discharge block 22. After that, the cooling oil 2 flows downward, and is discharged to the cooling oil reservoir 16 in the bed tank 3 through a plurality of the oil discharge holes 24 in the distal end part 9B of the oil discharge pipe 9.

As the above, in the present embodiment, since the oil discharge pipe 9 passes through the interface 23, and extends into the bed tank 3, it is possible to connect the dynamometer 5 with the bed tank 3 through the relatively short oil discharge pipe 9. Consequently, pressure loss of the cooling oil 2 flowing through the oil discharge pipe 9 decreases. Moreover, space occupied by the oil discharge pipe 9 decreases, and thereby the size of the dynamometer device 1 becomes small.

In addition, in the present embodiment, since the oil discharge holes 24 as outlets of the oil discharge pipe 9 are opened inside the bed tank 3, parts connecting the outlets of the oil discharge pipe 9 with the bed tank 3 can be omitted. Therefore, the number of steps accompanied with the assembling of the dynamometer device 1 is reduced.

Moreover, in the present embodiment, in the oil of the cooling oil reservoir 16, the cooling oil 2 is discharged from the oil discharge holes 24 in the radial direction of the oil discharge pipe 9, and thereby the occurrence of oil smoke at the time of oil discharging can be suppressed. Consequently, oil leak from the connection part of the bed tank 3 can be suppressed.

In addition, in the present embodiment, since the cooling oil 2 at high temperatures after cooling the coils, the permanent magnets and the like is discharged near the bottom part of the cooling oil reservoir 16 through the oil discharge pipe 9, the high temperature cooling oil 2 is returned into the part where the cooling oil 2 at low temperatures is stored, and consequently, the occurrence of the oil smoke can be more surely suppressed.

The invention claimed is:
1. A dynamometer device, comprising:
a tank provided with, at a top part thereof, a flat tank-side bed including an opening part, and storing a cooling medium;
a dynamo body provided on a flat dynamometer-side bed forming an interface between the dynamometer-side bed and the tank-side bed, the tank-side bed and the dynamometer-side bed being sealed by a seal surrounding the opening part; and
a pipe for returning the cooling medium from the dynamo body to the tank,
wherein the pipe communicates with a flow passage extending from an upper part of the dynamo body, is attached to the dynamometer-side bed, and passes through the interface, extends through the opening part located inside the seal and is opened inside the cooling medium inside the tank.

2. The dynamometer device according to claim 1, wherein the pipe has a cylindrical shape in which a distal end of the pipe is closed, and a plurality of oil discharge holes for discharging the cooling medium in a radial direction of the pipe are provided on an outer peripheral surface of the pipe.

* * * * *